United States Patent
Kandel et al.

(10) Patent No.: US 10,824,606 B1
(45) Date of Patent: Nov. 3, 2020

(54) STANDARDIZING VALUES OF A DATASET

(71) Applicant: Trifacta Inc., San Francisco, CA (US)

(72) Inventors: Sean Philip Kandel, San Francisco, CA (US); Zain Asgar, San Francisco, CA (US); Wei Zheng, San Carlos, CA (US); Philip John Vander Broek, San Francisco, CA (US)

(73) Assignee: Trifacta Inc., San Francisco, CA (US)

( * ) Notice: Subject to any disclaimer, the term of this patent is extended or adjusted under 35 U.S.C. 154(b) by 615 days.

(21) Appl. No.: 15/352,332

(22) Filed: Nov. 15, 2016

Related U.S. Application Data

(60) Provisional application No. 62/256,077, filed on Nov. 16, 2015.

(51) Int. Cl.
  *G06F 16/215* (2019.01)
  *G06F 16/22* (2019.01)
  *G06F 16/28* (2019.01)

(52) U.S. Cl.
  CPC .......... *G06F 16/215* (2019.01); *G06F 16/221* (2019.01); *G06F 16/285* (2019.01); *G06F 2216/03* (2013.01)

(58) Field of Classification Search
  CPC .................................................. G06F 16/215
  See application file for complete search history.

(56) References Cited

U.S. PATENT DOCUMENTS

| | | | | |
|---|---|---|---|---|
| 10,163,063 | B2* | 12/2018 | Chaturvedi | G06Q 10/06 |
| 2014/0108462 | A1* | 4/2014 | Pfeifle | G06F 16/29 |
| | | | | 707/795 |
| 2014/0180826 | A1* | 6/2014 | Boal | G06Q 30/0245 |
| | | | | 705/14.66 |
| 2016/0034500 | A1* | 2/2016 | Yang | G06F 16/211 |
| | | | | 707/609 |

* cited by examiner

*Primary Examiner* — Mark D Featherstone
*Assistant Examiner* — Ranjit P Doraiswamy
(74) *Attorney, Agent, or Firm* — Fenwick & West LLP

(57) ABSTRACT

A system standardizes values that occur in large datasets before the dataset is analyzed. The system identifies values in a dataset that are similar to each other and associates those values with each other to form groups. The system determines a canonical value for each group of associated values. Within each group, the system replaces values that have been associated with each other with the canonical value for the group. As a result, the dataset is transformed into a dataset that has standardized values, and the standardized dataset is provided as input for analysis by a data analysis system. By standardizing the dataset in this manner, the data analysis system can process a larger portion of the dataset.

21 Claims, 12 Drawing Sheets

FIG. 4

STANDARDIZING VALUES OF A DATASET

CROSS REFERENCE TO RELATED APPLICATION

This application claims the benefit of U.S. Provisional Application No. 62/256,077, filed on Nov. 16, 2015, which is incorporated by reference in its entirety.

INTRODUCTION

The disclosure relates in general to preprocessing data for analysis by big data analysis systems, for example, parallel and distributed systems and more specifically to standardizing data such that variations of values of an attribute (or attributes) are replaced by a canonical representation of the values.

Organizations generate large amounts of data during their normal operations. Data may be generated by systems as a result of transactions performed within the organization, as a result of interactions with external systems, by sensors, by manual entry of data, and so on. This data often includes structured data as well as unstructured and/or semi-structured data stored in a wide variety of formats.

Organizations perform data mining operations on the data generated to extract different types of information. This includes information indicating health of various components of the organization, information predicting performance of various projects within the organization, information describing allocation of resources within the organization, and so on. Big data analysis systems process the huge amount of data being generated by organizations. These big data analysis systems typically use parallel and distributed systems to process the data. Big data analysis systems typically need the data to be available in a specific format to be able to analyze that data and exploit the parallelism inherent in the data.

However, the quality of raw data that is generated by various systems within the organization is often poor. In other words, raw data generated by the disparate sources within the organization is not in a format that can be readily processed by big data systems. Such raw data often contains missing fields, data anomalies, erroneous values, duplicate values, nested structures that cannot be processed by the big data analysis system, data that does not conform to certain type constraints, and so on.

One problem with data received from disparate sources is that the same value may be represented in different ways in different records. For example, the same value may be represented in various ways due to typos, use of abbreviations of terms, or use of other variations of the value. Accordingly, the same record may appear multiple times in the dataset and the system may treat each occurrence as a different values or records. As a result, analysis of the data results in erroneous results. For example, the number of records obtained by performing different types of analysis may result in incorrect values, the data may not join with other datasets if the join is performed using an attribute that includes variations of data values, and so on.

SUMMARY

Embodiments of the invention standardize values occurring in large datasets. A system receives a dataset for analysis by a data analysis system. The dataset includes a plurality of records, each record has one or more attributes, and each attribute has a value. For example, each record represents a business establishment and contains a first attribute representing the address of the business establishment (e.g., with a value of "2526 W Van Buren Street, Phoenix, Ariz., 85009") and a second attribute representing categories for the business establishment (e.g., with a value of ["Restaurants"]).

The system identifies groups of values of an attribute or attributes that are similar and associates them with each other. The system determines a canonical value for each group of associated values. Within each group, the system replaces values that have been associated with each other with the canonical value for the group. As a result, the dataset is transformed into a dataset that has standardized values, and the standardized dataset is provided as input for analysis by a data analysis system. The standardization of such large datasets simplifies processing of these datasets and may allow a larger portion of the data in the dataset to be processed. For example, joining two standardized datasets results in better association of records that are related rather than joining datasets without performing any standardization.

BRIEF DESCRIPTION OF DRAWINGS

The features and advantages described in the specification are not all inclusive and in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

The disclosed embodiments have other advantages and features which will be more readily apparent from the detailed description, the appended claims, and the accompanying figures (or drawings). A brief introduction of the figures is below.

FIG. 4 shows a screenshot of a user interface illustrating various interactions with the data preprocessing system, according to an embodiment.

The steps of processes illustrated as flowcharts described herein can be executed in an order different from that described herein. Furthermore, actions described as being executed by certain software modules may be executed by other software modules than those indicated herein.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

DETAILED DESCRIPTION

System Environment for Big Data Analysis

Figure 1:
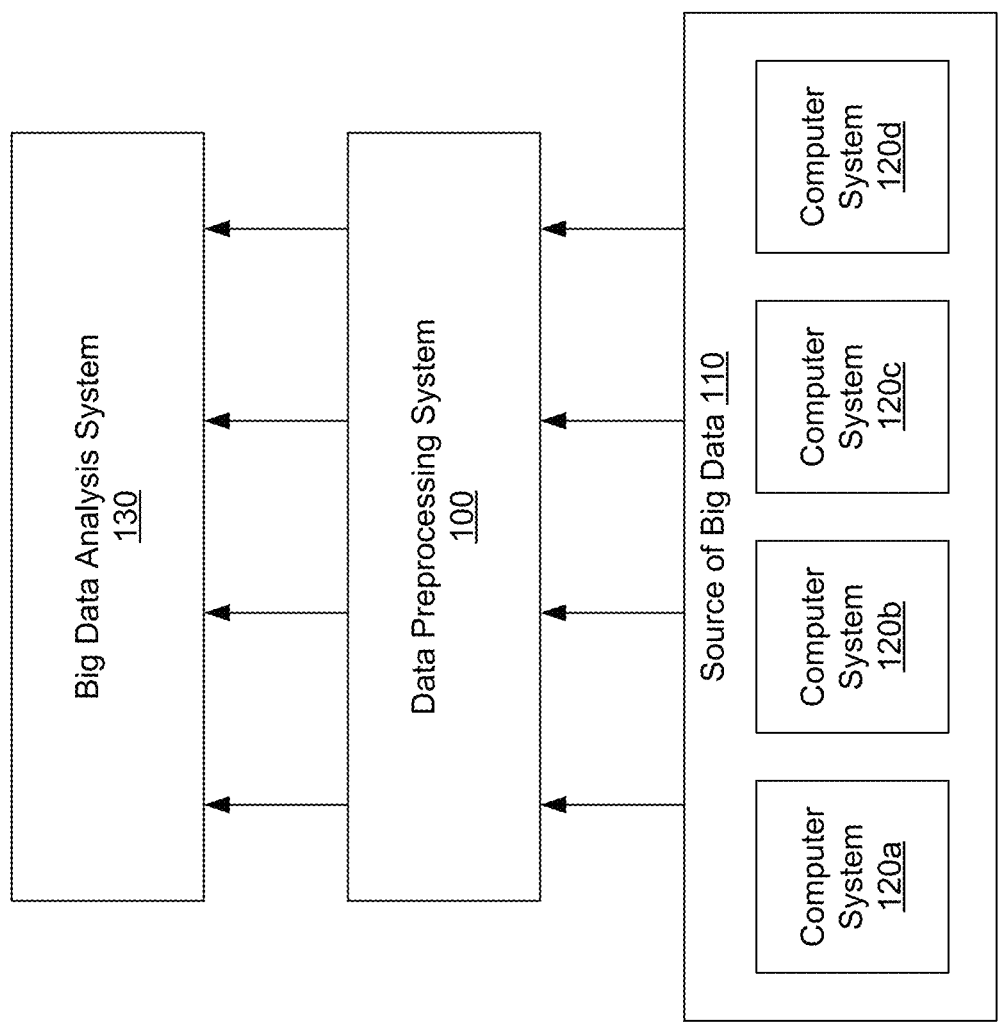
FIG. 1 shows the overall system environment for performing big data analysis, according to an embodiment.

FIG. 1 shows the overall system environment for performing big data analysis, according to an embodiment. FIG. 1 shows various systems involved in the generation of and processing of big data. Each of the various systems may be implemented as one or more computing systems, where each computing system includes a storage medium that stores data and computer readable instructions, a processor capable of executing the computer-readable instructions, a network interface that communicatively couples the computing system to other computing systems, and input/output devices.

The overall system environment includes a source of big data 110, a data preprocessing system 100, and a data analysis system 130. In other embodiments, additional or fewer systems/components than those indicated in FIG. 1 may be used. For example, the various systems shown in FIG. 1 may interact via a network (not shown in FIG. 1). Furthermore, there may be more or less instances of each system shown in FIG. 1. For example, there may be multiple instances of big data analysis systems 130. The big data analysis system 130 may also be referred to herein as a data analysis system, analysis system, or a system.

FIG. 1 and the other figures use like reference numerals to identify like elements. A letter after a reference numeral, such as "120a," indicates that the text refers specifically to the element having that particular reference numeral. A reference numeral in the text without a following letter, such as "120," refers to any or all of the elements in the figures bearing that reference numeral (e.g. "120" in the text refers to reference numerals "120a" and/or "120b" in the figures).

The source of big data 110 may be an organization or enterprise that uses multiple computer systems 120 for processing data of the organization or enterprise. Each computer system 120 performs activities that result in generation of data. For example, a computer system 120 may perform transactions and generate logs based on the transactions. Another computer system 120 (or systems) may process and generate data-based social interactions by logging actions performed by users. Another computer system 120 may process, generate, and store images. The big data analysis system 130 analyzes the data available in the computer systems 120.

Because the amount of data generated by such sources of data can be large and unstructured, conventional analysis tools (e.g., reporting systems based on database queries) are often incapable of processing this data. As a result, big data analysis systems 130 are often parallel and distributed systems and are capable of processing unstructured data. Big data analysis systems 130 typically analyze big data to perform data mining operations, predictive analysis, forecasting, text mining, and so on. For example, large amounts of data representing sales, interactions between users, and so on may be used to derive sales trends among different types of consumers, to predict the success of different sales or marketing campaigns, and so on.

The raw data produced by the source of big data 110 often includes records that are not in a form that the big data analysis system 130 can process. The big data analysis system 130 typically requires the input data to conform to certain formatting rules. The formatting rules may be specific to certain columns of a dataset or may apply to multiple columns. A formatting rule may specify various constraints applicable to a particular type of data. For example, a column storing addresses may have several constraints. For example, the values in a state field must be a valid state (given a country), the zip code must be from a set of valid zip codes and also must conform to the format of the country, and so on.

The sources of big data 110 often produce data in formats that are not anticipated by the big data analysis system 130. Following are examples illustrating non-conformance of raw data with respect the formatting rules of a big data analysis system 130. The big data analysis system 130 may expect a particular field to be numeric whereas various data records obtained from the source of big data 110 may include alphabetic characters or even special characters. Similarly, the big data analysis system 130 may expect a field to store URLs (uniform resource locators) and not all values of the field produced by the source of big data 110 may include URLs in a proper format. As another example, the big data analysis system 130 may assume one or more different formats of addresses for an address field and the raw data may include addresses that do not conform to these formats of addresses.

The data preprocessing system 100 performs processing of the raw data obtained from the sources of big data 110 to transform the raw data into a format that is suitable for consumption by the big data analysis system 130 (i.e., a format that conforms to the formatting rules of the big data analysis system 130). For example, if the raw data includes URLs that do not conform to the standard URL format, the data preprocessing system 100 transforms the data to generate URL in a format that can be processed by the big data analysis systems 130. For example, assume that several URL fields include values of the form "http;//xyz.com" where the prefix "http" is followed by ";" (a semicolon) instead of ":" (a colon). This may happen, for example, if the URLs are obtained from logs based on URL values manually entered by users (that include commonly occurring typos).

The step of preprocessing the data is also referred to as cleansing the data by modifying data that does not satisfy various formatting criteria that determine whether the data can be processed by the big data analysis system 130. For example, end users often make mistakes while entering URLs, thereby introducing incorrect URL values in the data. However, the data entered by the user is still valuable information because the system can derive information based on the fact that the user intended to enter a specific URL. The intended URL may be obtained by performing a transformation of the incorrect URL field that replaces ";" with ":". The data preprocessing system 100 may include a large number of such transform operations that pre-process the raw data produced by sources of big data 110.

The transform operations may be provided by experts that review the data produced by the big data source 110. The data preprocessing system 100 may include transform operations based on commonly occurring patterns of bad data typically generated by sources of big data 110. Accordingly, the data preprocessing system 100 takes raw data generated by sources of big data 110 and prepares (or preprocesses) the data so as to transform the raw data for consumption by big data analysis system 130.

The data preprocessing system 100 may not be able to transform all available raw data to a format that conforms to the formatting rules of the big data analysis system 130. For example, certain fields may store values from which no meaningful information may be deciphered. However, if the data preprocessing system 100 is able to preprocess a significant portion of raw data, the amount of information available to the big data analysis system 130 increases by certain amount.

As an example, assume that the big data analysis system is able to process 50% of the raw data generated by the source of big data 110 without any preprocessing. The remaining 50% of the raw data is assumed to be bad raw data that does not conform to the formatting rules of the big data analysis system 100. Assume further that the data preprocessing system 100 is able to transform 80% of the bad raw data to a form that can be processed by the big data analysis system 130 but is unable to decipher the remaining 20% of the bad raw data. In this situation, even though the data preprocessing system 100 is unable to decipher 20% of the bad raw data, the data preprocessing system 100 helped increase the amount of data that can be processed by the big data analysis system 130 to 90% of the original raw data. As a result, the big data analysis system 130 is likely to be able to generate more accurate information or derive new information based on the additional data that the big data analysis system 130 is able to process.

Embodiments allow users to interact with datasets to build transformation scripts that are used by the data preprocessing system 100 to preprocess data received from sources 110. The data preprocessing system 100 presents users with samples of data sets and provides a user interface for analyzing the data by grouping values of an attribute, or sets of attributes, or entire records. A group of records corresponds to records that are determined the data preprocessing system to be equivalent (i.e., representing the same records). The data preprocessing system 100 automatically generates transformation operations based on user interactions. The data preprocessing system 100 presents the automatically generated transformation operations to users and receives selections of one or more automatically generated transformation operations. The data preprocessing system 100 adds the selected transformation operations to the transformation script. The data preprocessing system 100 executes the transformation script on the complete dataset to preprocess the dataset for processing by the big data analysis system 130.

System Environment for Data Preprocessing

Figure 2:
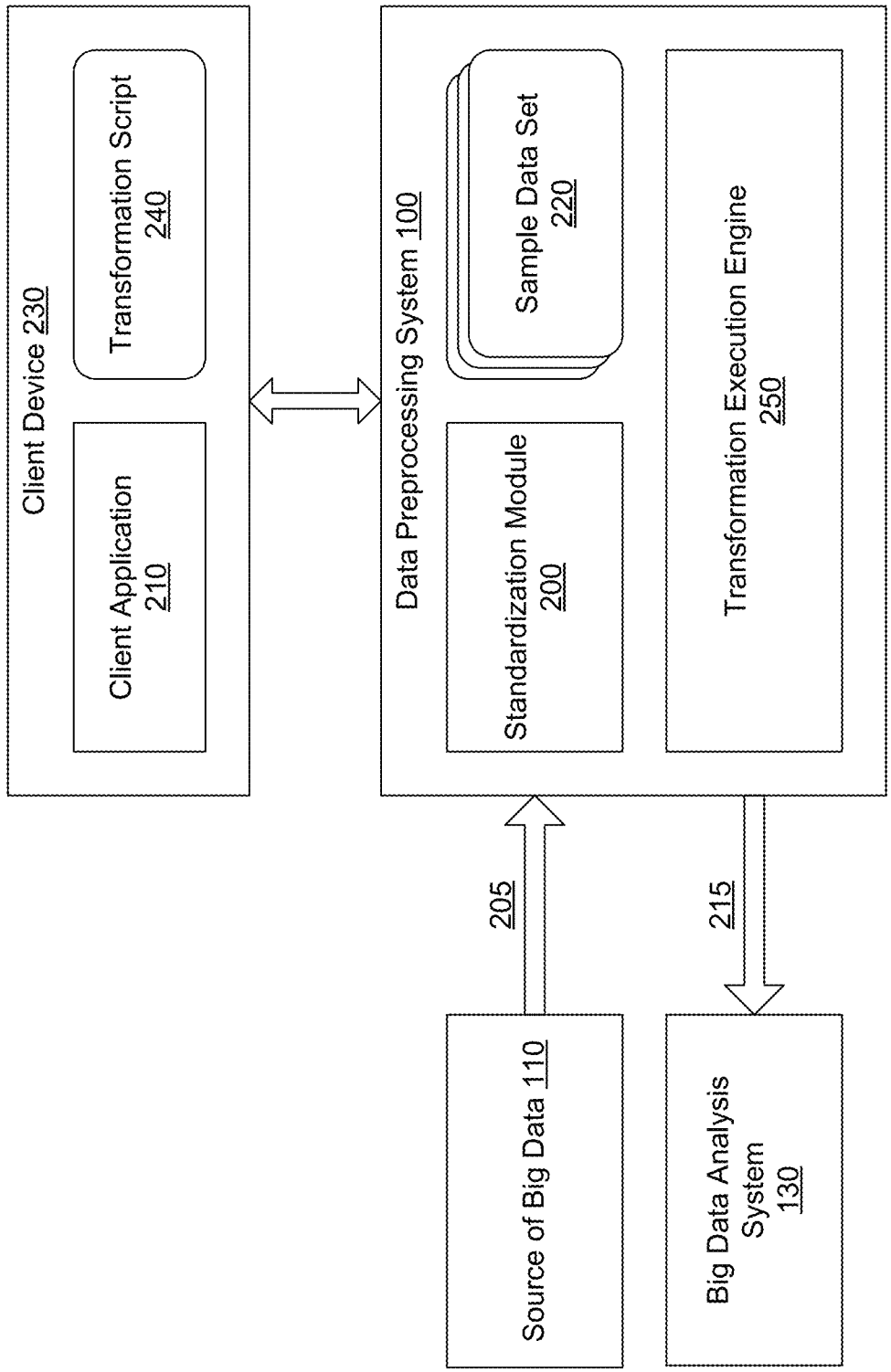
FIG. 2 shows the overall system environment illustrating details of data preprocessing system for preprocessing data for big data analysis, according to an embodiment.

FIG. 2 shows the overall system environment illustrating details of a data preprocessing system 100 for preprocessing data for big data analysis, according to an embodiment. As described in connection with FIG. 1, the data preprocessing system 100 receives 205 data from sources of big data 110, preprocesses the data to improve the amount of data that conforms to the formatting constraints of the big data analysis system 130, and provides 215 the preprocessed data to the big data analysis system 130.

The data preprocessing system 100 configures for presentation a user interface for interfacing with the data preprocessing system 100 and presents the user interface to users via the client device 230, for example, as a client application 210. The client device 230 executes the client application 110, thereby allowing a user to interact with the data preprocessing system 100, for example, to develop and/or test a transformation script 240 used for preprocessing the data. The transformation script 240 includes a set of transform operations (or a sequence of transform operations that are executed in a particular order.) The client application 210 may be a web browser that interacts with the data preprocessing system 100 via the Internet. Alternatively, the client application 210 may be a custom application that interacts with the data preprocessing system 100 via the Internet or proprietary communication protocols.

In one embodiment, a computer system executing code for the data preprocessing system 100 or the client device 230 is a computer system executing, for example, a Microsoft Windows-compatible operating system (OS), Apple OS X, and/or a Linux distribution. In another embodiment, the computer system can be a device having computer functionality, such as a personal digital assistant (PDA), mobile telephone, video game system, etc. The computer system includes a non-transitory storage medium storing instructions that perform the various steps described herein. The client application 210 makes the client device 230 a special purpose computer system for performing analysis of data for preprocessing. Similarly, the computer system of the data preprocessing system 100 stores modules such as transformation execution engine 250 and standardization module 200 (described in further detail with reference to FIGS. 3A and 3B) that makes the data preprocessing system 100 a special purpose computer system for performing preprocessing of data. The various systems shown in FIG. 2 may interact via a network (not shown in the figure). The network enables communications between the various systems.

The data preprocessing system 100 receives datasets for processing from the sources of big data 110. A dataset comprises one or more attributes. In an embodiment, the attributes of the dataset are represented as columns and the dataset is represented as a set of columns. A column comprises a set of cells, each cell storing a cell value. Accordingly, the dataset may be represented as rows and column, where each row corresponds to a tuple including a value of each attribute.

The data obtained from the sources of big data 110 is typically too large to be viewed in a reasonable time by a user for purposes of preprocessing the data. In an embodiment, the data preprocessing system 100 receives requests from the user to generate sample datasets 220. The data preprocessing system 100 presents user interfaces to a user via the client application 210 to receive requests from the user for developing the transformation script. The requests for developing the transformation script include reviewing a sample dataset, standardizing values or records of the sample of dataset, executing a transformation command on the sample dataset, and determining whether to add the transformation command to the transformation script.

The transformation execution engine 250 executes one or more transformation commands or a transformation script against a sample dataset 220 or against the entire dataset received from a source of big data 110. In some embodiments, the execution of the transformation script on the entire dataset is performed by a system different from the data preprocessing system 100. The execution of the transformation script on the entire dataset may be performed as an offline process (or batch process) that does not require interactions with users once the execution is started.

The process of developing the transformation script is an iterative process that may involve several interactions between the data preprocessing system 100 and the user via the client application 210. Once the transformation script 240 is finalized, the data preprocessing system 100 executes the transformation script 240 against the entire dataset received from the source of big data 110. The result of the execution of the transformation script 240 against the entire dataset is presented to the big data analysis system 130. This provides the big data analysis system 130 with data that has a much larger percentage of data that conforms to the formatting rules of the big data analysis system compared to the raw data provided by the sources of big data 110.

System Architecture of the Data Preprocessing System

Figure 3A:
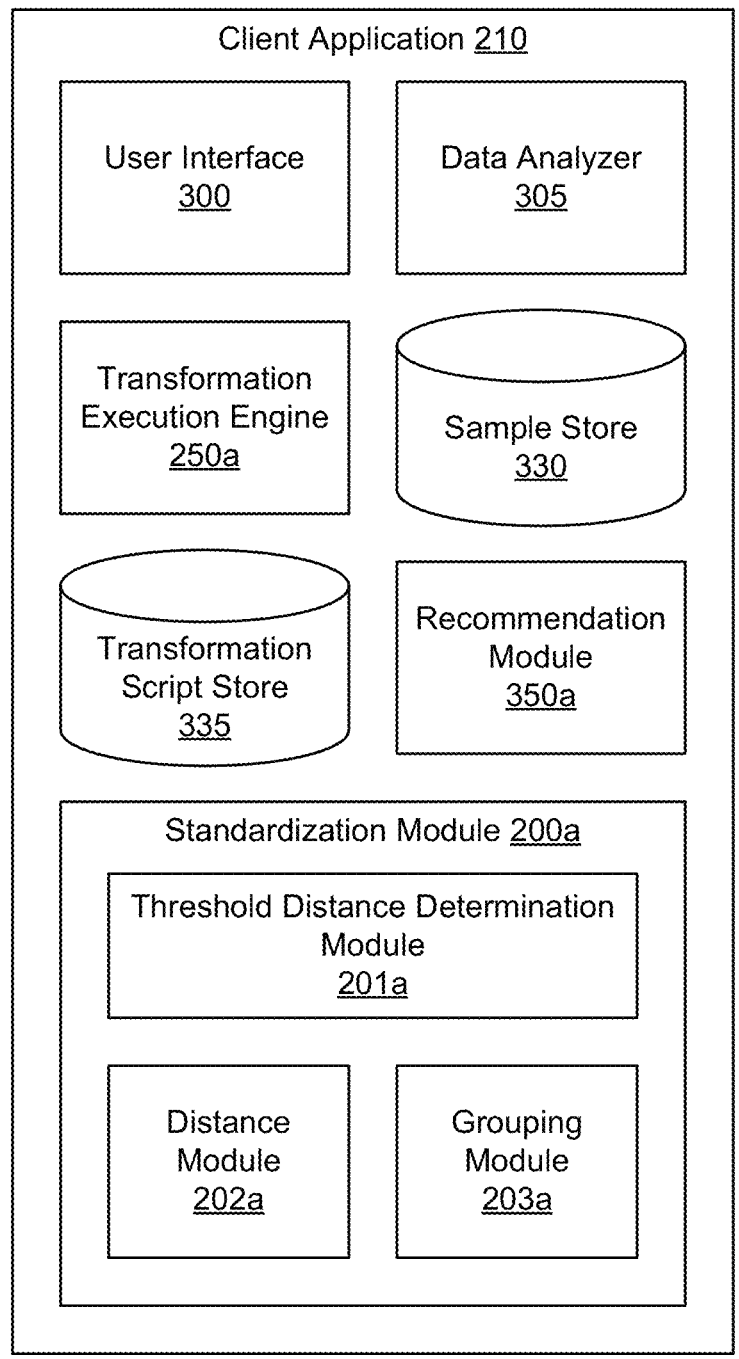
FIG. 3A shows architecture of a client application for interacting with a data processing system for developing transformation scripts for preprocessing data for big data analysis, according to an embodiment.

FIG. 3A shows architecture of a client application 210 for interacting with a data preprocessing system 100 for developing transformation scripts for preprocessing data, according to an embodiment. The client application 210 includes a user interface 300, a data analyzer 305, a transformation execution engine 250a, a sample store 330, a transformation script store 335, a recommendation module 350a, and a standardization module 200a. In other embodiments, the data preprocessing system 100 may include other modules not described herein. Functionality indicated as provided by a particular module may be implemented by other modules instead.

The user interface 300 presents information describing the dataset to the user and provides various widgets for allowing users to interact with the data. The information describing the dataset includes a textual representation of the data as well as charts describing the data. The user interface 300 presents transformation recommendations to the user and receives selections of transformation recommendations. The user interface 300 also allows users to enter transformations manually via a text box.

The data analyzer 305 performs various types of analysis on the data in the dataset sample being processed by the client application 210. For example, the data analyzer 305 determines the frequency of occurrence of various values of an attribute to provide information for displaying a histogram representing the attribute.

The transformation execution engine 250 receives transformations and executes the transformations for a given set of input datasets. In an embodiment, the transformation execution engine 250 receives a transformation script and executes the transformation script for a given set of input datasets. The transformation execution engine 250 includes instructions to execute various operators associated with the transformations. Examples of operators (or transformations based on the operators) include replacing a substring with another string, replacing a character with another character or string, replacing a substring at a particular location by another string (the location determined by identifying a character/substring and indicating whether the substring to be replaced occurs before/after the identified character/substring), splitting a column based on a separator into multiple columns, extract a substring from an attribute, joining two or more datasets based on join keys, aggregating records, grouping records, determining aggregate values of a column for groups of records based on certain criteria, filtering records based on certain criteria such that only records satisfying the given criteria are output by the transform operation, extracting an attribute within a composite attribute as a new column of the dataset, and so on.

The sample store 330 stores samples of various datasets stored in the dataset store 315 (which is described with reference to FIG. 3B). The data preprocessing system 100 provides these dataset samples for use in developing and testing transformation scripts. The data preprocessing system 100 uses dataset samples for development and testing of transformation scripts because the entire dataset received for processing may be very large. As a result, development and testing of transformation scripts based on an entire dataset may be slow since execution of each transformation on the entire dataset may take a long time. Samples stored in the sample store 330 may be determined by the sampling module 360 (described with reference to FIG. 3B). The transformation scripts may be used for preprocessing datasets received for data analysis using the datasets, for example, using big data analysis systems 130.

The transformation script store 335 stores transformation scripts being developed by a user using the client application 210. The transformation script store 335 may represent each script as a sequence of transformation operations. The transformation script store 335 may associate each transformation operation of a transformation script with a sequence number representing an order in which the transformation operations are executed in the transformation script. In an embodiment, the transformation store 335 stores individual transformations using a text format, for example, a syntax of a proprietary script, syntax of a standard programming language, or using markup languages such as XML (extensible markup language).

The recommendation module 350 presents users with various transformations that can be used for processing data of a dataset in a given context. The recommendation module 350 may generate recommendations in response to certain user actions, for example, a selection of a data element or a portion of data element by the user. For example, assume that the user interface 300 receives a user selection of a portion of a data value "???" in a data element of a column specified using the client application 210. The user interface 300 provides information indicating the data value selected, the column of the data value, and so on. The recommendation module 350 identifies various data transforms applicable to the user selection and sends the identified data transforms for display to the user via the user interface 300.

The standardization module 200 identifies groups of values of an attributes of a dataset based on their similarity. Accordingly, the values in a group are variations of a particular value that differ due to various reasons, for example, data entry errors, use of abbreviations, and so on. The standardization module 200 also determines groups of records based on their similarity. Each record comprises a set of attributes or a subset of attributes of the dataset. The standardization module 200 provides the groups of records as matching records such that all records from a group are determined to be representing the same data. The data preprocessing system 100 presents the groups of attribute values or groups of records via the client application 210 to users to review. The data preprocessing system 100 makes a recommendation to the user that each group of values represents the same value and should be replaced by one value. A user can review and approve whether a group represents variations of the same values or records. If the user approves that the group represents variations of the same values or records, the user approves the group as a valid group and identifies a canonical value for the group. The data preprocessing system 100 receives the approval of the user and the canonical value. The data preprocessing system 100 associates the canonical value with the group. The data preprocessing system 100 uses the canonical value to standardize the dataset by replacing other values of the group with the canonical value in the dataset.

In an embodiment, the standardization module 200 uses a plurality of distance metrics for grouping values. Examples of distance metrics used by the standardization module 200 include string-based distance metrics, for example, edit/Jaro distance; token-based (using words/trigrams) distance metrics, for example, Jaccard based distance metrics, TF-IDF based distance metrics; hybrid distance metrics, for example, soft TF-IDF, Monge Elkan that includes near match in the TF-IDF (term frequency-inverse document frequency) calculation, and sound based distance metrics. In an embodiment, the standardization module 200 sends questions to users confirming whether two values are equivalent or not. The standardization module 200 uses the answers provided by the user to determine whether a distance metric is effective or not. Accordingly, the standardization module 200 may start with a set of distance metrics and then eliminate some distance metrics from the set as being not effective for the dataset.

In an embodiment, the standardization module 200 comprises other modules that are invoked for performing various functions indicated herein as being performed by the standardization module 200. For example, the standardization module 200 includes a threshold distance determination module 201a for determining threshold distance values based on a measure of strictness receives from the user, a distance module 202a for determining various distances between data values, and a grouping module 203a that determines groups of values based on distances between the values (for example, by performing a clustering technique).

In an embodiment, the standardization module 200 uses a first attribute to group a second attribute. For example, even if the distance between two values based on a metric is greater than a threshold (determined based on a measure of strictness of grouping), the standardization module 200 checks if another attribute for the same records shows that the two records are matching. For example, the standardization module 200 may determine that two address values are matching even if they are significantly different if an email attribute for the two records is determined to match.

Figure 3B:
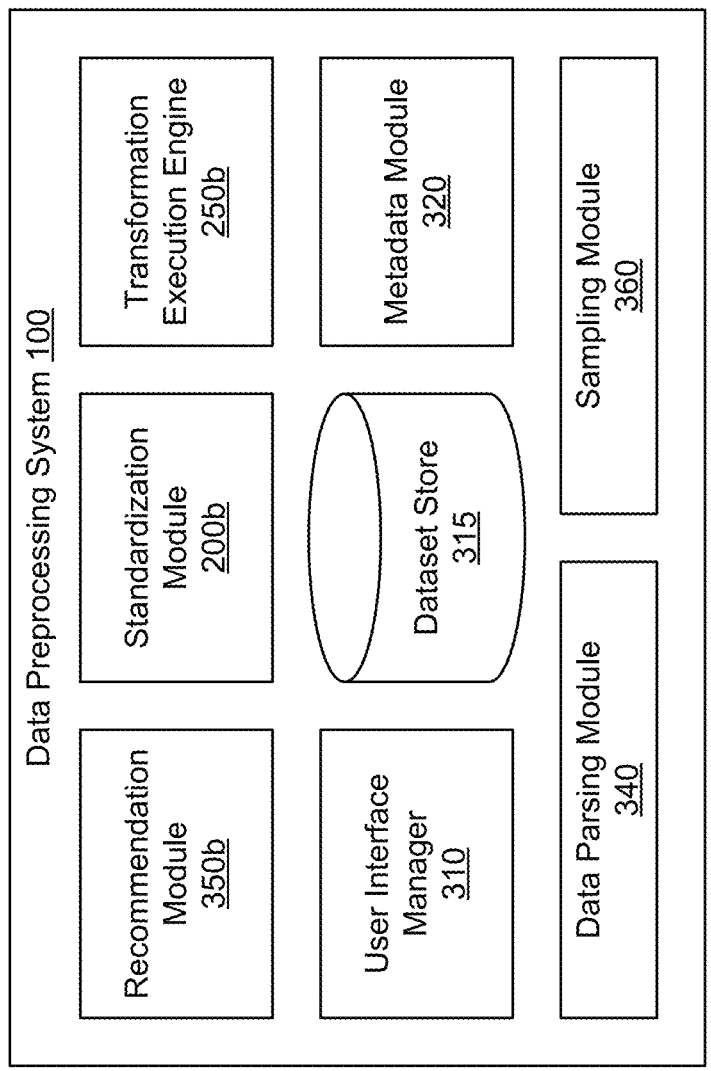
FIG. 3B shows the architecture of a data preprocessing system for preprocessing data for big data analysis, according to an embodiment.

FIG. 3B shows the architecture of a data preprocessing system 100 for preprocessing data for big data analysis, according to an embodiment. The data preprocessing system 100 includes a recommendation module 350b, a standardization module 200b, a transformation execution engine 250b, a user interface manager 310, a dataset store 315, a metadata module 320, a data parsing module 340, and a sampling module 360. In some embodiments, the data preprocessing system 100 includes other modules not described herein. Functionality indicated as provided by a particular module may be implemented by other modules instead.

Some of these modules are described above in connection with FIG. 3A. As a result, a client application 210 may execute an operation on the client device 230 or send a request to the data preprocessing system 100 to perform the same operation. For example, the client application 210 may be configured to pass user actions to the user interface manager 310 of the data preprocessing system 100 so that the recommendation module 350b of the data preprocessing system 100 can receive those user actions and generate recommendations in response to those user actions.

Some of the modules are stored on the data preprocessing system 100 so as to allow processing of the entire data set or a larger subset of the dataset. For example, the standardization module 200a of the client application 210 performs standardization of records within a sample of records stored in the client device 230 and the standardization module 200b of the data preprocessing system 100 performs standardization of records on the entire dataset stored in the dataset store 315 or on a subset of the dataset stored in the dataset store 315. As another example, the transformation execution engine 250a of the client application 210 executes transformations on data of a sample stored in the client device 230 and the transformation execution engine 250b of the data preprocessing system 100 executes transformation on the entire dataset stored in the dataset store 315 or on a subset of the dataset.

The user interface manager 310 configures and presents various user interfaces to a client device 230, allowing a user to interact with the data preprocessing system 100. The user interfaces configured by the user interface manager 310 allow the user to identify datasets, specify transformations to be performed on the datasets, present information describing the datasets and so on. Various example user interfaces are described herein and presented as screenshots, for example, in FIGS. 4, 8, and 9.

In an embodiment, the user interface manager 310 configures a markup language document, for example, an HTML (hypertext markup language) document corresponding to a user interface. The user interface manager 310 sends the markup language document for presentation via a web browser (that represents a client application 210) executing on a client device 230.

The dataset store 315 stores datasets and metadata describing the datasets. In an embodiment, the data preprocessing system 100 presents a user interface to a user allowing the user to specify a source for a dataset. The user interface is presented to the user via the client application 210. The data preprocessing system 100 receives data for the dataset from the source and stores the dataset in the dataset store 315. The source of the dataset can be a file stored locally on the system executing the data preprocessing system 100, on a client device 230 used to provide the information, or on an external system. The data preprocessing system 100 receives information identifying the dataset, for example, a file address, a URL, or information identifying a data stream.

The metadata module 320 determines metadata describing the datasets received by the data preprocessing system 100. In an embodiment, the metadata module 320 takes a sample of rows and identifies row separators and column separators. By analyzing the various data values corresponding to columns, the metadata module 320 infers types of each column. In an embodiment, the metadata module 320 sends information describing the various column types to the user via the user interface manager 310. The user interface manager 310 presents the inferred metadata describing the various columns to the user via the client application 210. The client application 210 allows the user to modify the inferred column types, thereby reassigning one or more column types to a manually specified data types. The metadata module 320 receives the manually specified column types and updates the metadata stored in the dataset store 315 accordingly.

The data parsing module 340 parses data received by the data preprocessing system 100 to determine various parts of the data. The data parsing module 340 identifies record separators, for example, based on newline characters to determine where one record of the dataset ends and the next record begins. The data parsing module 340 may also be stored in the client application 210 (not shown in FIG. 3A).

The sampling module 360 generates samples of datasets in the dataset store 315 and sends the dataset samples to client devices to be stored in the sample stores 330 of the client devices. As noted above with reference to FIG. 3A, the modules of the client application 210 can be configured to perform operations on dataset samples rather than entire datasets.

User Interface for Preprocessing Data for Big Data Analysis

Figure 4:
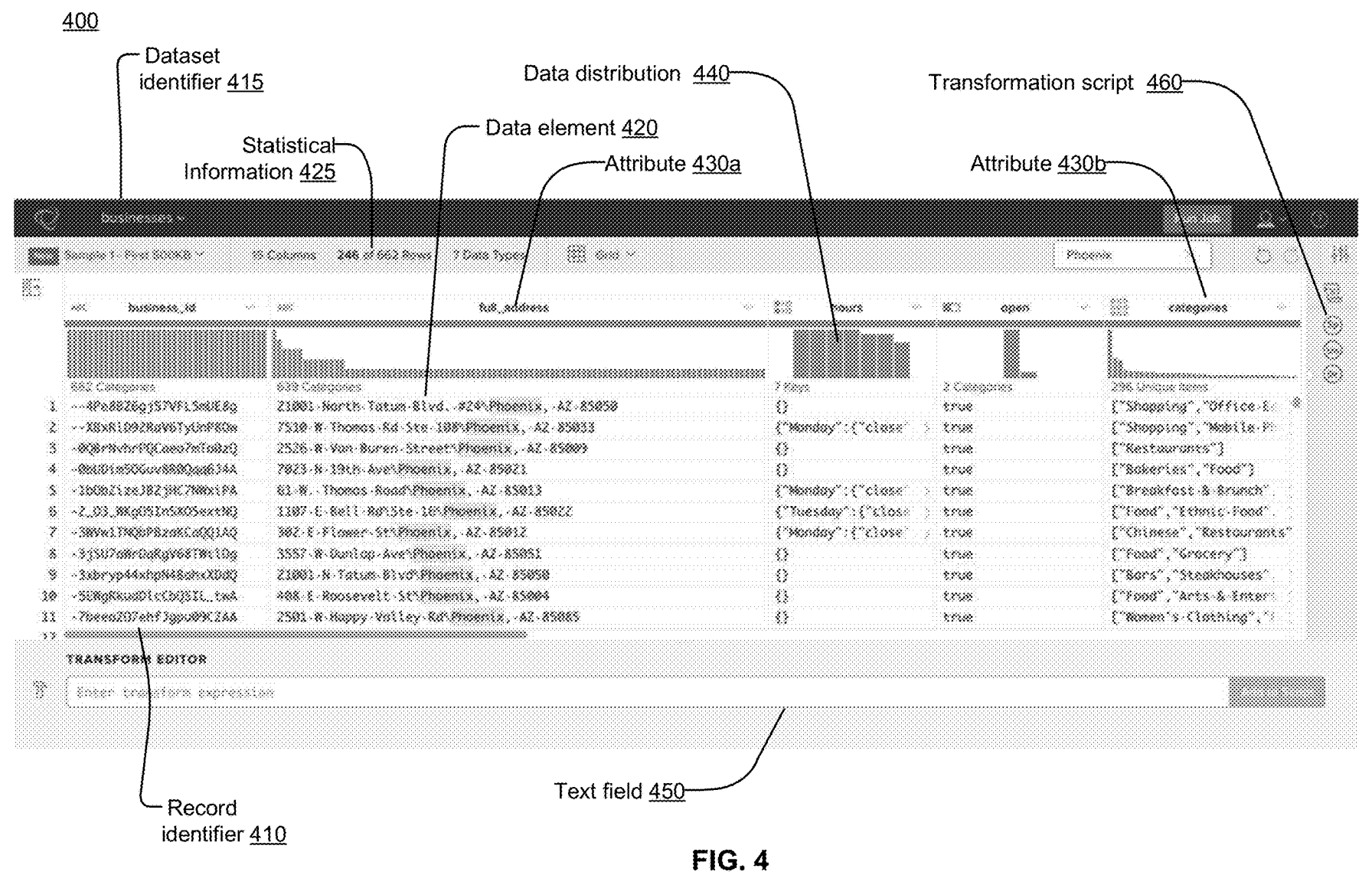

The data preprocessing system 100 allows users to interact with the data being analyzed for purposes of defining various transformations and generating samples of data. The user interface manager 310 renders user interfaces and sends information describing a user interface for presentation to the user via the client application 210. The screenshot illustrated in FIG. 4 is an example of a user interface presented to a user via the client application 210. The data preprocessing system 100 can configure the user interfaces in various ways, for example, by using different widgets than those indicated in the user interfaces, arranging the various user interface elements in different positions than indicated, and so on.

FIG. 4 shows a screenshot of a user interface 400 illustrating various interactions with the data preprocessing system, according to an embodiment. The user interface 400 may be presented by the client application 210 via the client device 230. The user interface 400 presents information describing a sample of a dataset stored in the data preprocessing system 100. The user interface 400 presents the data of various attributes in textual form as well as using a visual representation, for example, histograms or other types of charts.

The user interface 400 shown in FIG. 4 shows information describing a dataset identified by the dataset identifier 415 (e.g., "Businesses"). A user may upload the dataset from a source of dataset that can be an external system, a file stored on a local machine or in the cloud, or any other mechanism for storing the data. The user specifies a dataset identifier 415 for each dataset that is loaded. The process of loading the dataset is not illustrated in the screenshot of FIG. 4 and occurs before the data preprocessing system 100 presents the user with the screenshot shown in FIG. 4.

The user interface 400 shown in FIG. 4 presents a subset of data of the dataset being processed, for example, a sample of the dataset stored on the data preprocessing system 100. The user interface 400 may show only a subset of the sample. The data of the dataset shown in FIG. 4 represents information describing business establishments.

The dataset includes a set of attributes 430 (an attribute may also be referred to as a data field.) Each attribute stores a particular type of data. For example, the attribute 430a stores an address, the attribute 430b stores one or more categories for the business. As shown in FIG. 4, each attribute 430 is represented as a column with the name of the attribute 430 displayed at the top of the column.

A type of the attribute is associated with certain formatting rules (or type rules) associated with the data. The formatting rules specify characteristics of the data of the attribute. For example, an attribute that represents a URL is subject to a formatting rule that requires the URL to be a string starting with "http://" and followed by a website address. As another example, an attribute that stores a description of a business is subject to a formatting rule that does not allow the description to include certain special characters, such as a question mark ("?").

The subset of data presented in the user interface 400 comprises a plurality of records. Each record comprises values for attributes of the dataset. A value may be empty. A record is identified by a record identifier 410 that represents a unique value associated with the record. As shown in FIG. 4, the data of the dataset is organized as rows and columns, with each column representing an attribute and each row representing a record.

An attribute 430 may store data that does not conform to the formatting rules associated with the attribute. For example, a data element stores value "http;www.highland-snj.com" for an attribute representing a URL, and this value does not conform to the formatting rules of the attribute. Specifically, the data element is not of the form "http://" followed by the web page address since it stores a prefix "http;".

The user interface 400 presents statistical information 425 describing the attributes. As shown in FIG. 4, the user interface 400 shows visualization of the data distribution 440 of each field. The data distribution 440 is shown using a visual representation such as a chart. In an embodiment, a visual representation of an attribute shows geometric shapes (for example, rectangles or bars) representing statistical information describing the attribute.

As an example, statistical information describing an attribute is shown as a histogram. The histogram may be represented as a bar chart such that each bar represents a distinct data value of the attribute. Alternatively, each bar may represent a set of values of the data elements of the attribute. For example, if an attribute occupies a very large number of distinct values, the data preprocessing system 100 divides the attribute values into buckets. Each bar of the histogram displayed represents a bucket representing a set or range of values of the attribute.

The user interface 400 allows users to interact with the geometric shapes of the visual representation of an attribute, for example, bars of a histogram representing the data distribution 440 of the attribute. For example, if a user hovers over (or selects) a particular bar of the histogram with a pointing devices such as a mouse, the user interface 400 displays information describing that particular bar including the number of elements of the dataset having the data value or data values associated with the bar and/or the data value or data values corresponding to the bar. Other interactions of the user with the bar are further described herein.

The user interface 400 shown in FIG. 4 presents the user with a text field 450 for allowing users to input transformations. A user may specify a transformation (also referred to as transformation rules or transformation operation or a transform) for preprocessing the data of a dataset thereby increasing the amount of data that can be analyzed by the big data analysis system 130. For example, the transformations may process data elements having data formatting errors as described above to eliminate the errors.

The transformations added by the user are included in the transformation script 460. FIG. 4 shows the transformation script as empty since the user has not yet added any transform operations to the transformation script 460. However, as the user interacts with the dataset via the user interface 400, the user adds transformations using the text field 450 that are included in the transformation script 460.

Overall Process for Preprocessing Data

Figure 5:
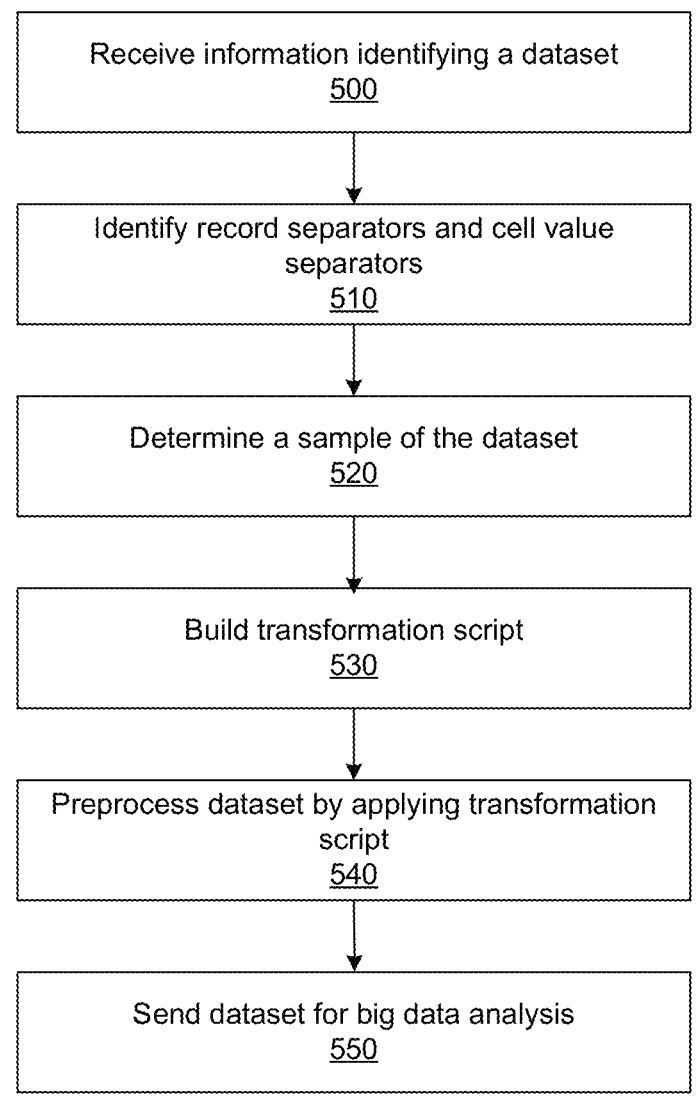
FIG. 5 shows the overall process for preprocessing data in preparation for analysis by a big data analysis system, according to an embodiment.

FIG. 5 shows the overall process for preprocessing data in preparation for analysis by a big data analysis system, according to an embodiment. In an embodiment, the data preprocessing system 100 performs the steps of the process illustrated in FIG. 5. Various steps discussed can be executed in an order different from that shown herein. Furthermore, specific steps can be executed by modules different from those indicated herein.

The user interface manager 310 receives 500 information identifying a dataset. The information identifying the dataset may be an address of a file stored locally on the data preprocessing system 100, a URI (uniform resource identifier) of a file on a remote system, a file on an external storage device attached to the data preprocessing system 100, and so on. The data preprocessing system 100 uploads the dataset and may store the dataset in the dataset store 315 or may simply store metadata describing the data in the dataset store 315 such that the data itself may be retrieved from the source identified.

The data parsing module 340 parses the data of the dataset and identifies 510 the record separators and cell value separators. The data parsing module 340 also determines any structural information of the individual cell values, for example, whether a cell stores a single value, an array value, a nested data structure, and so on.

The sampling module 360 samples the dataset to determine 520 a sample dataset for preprocessing. Typically, a dataset being processed by the big data analysis system 130 is large. As a result, preprocessing based on the entire dataset can be a slow process. Therefore, the sampling module 360 determines 520 a sample of the dataset. The data preprocessing system 100 presents the sample of the dataset or a portion of the sample of the dataset to the user via the client application 210.

The data preprocessing system 100 builds 530 the transformation script for preprocessing the data via interactions with a user. The data preprocessing system 100 builds the transformation script by interacting with the user via the client application 210. The data preprocessing system 100 performs interactions with the users for performing various task including building the transformation script and performing standardization of values/records of the sample of datasets. The client application 210 (or the data preprocessing system 100) recommends transform operations based on interactions of the user. The client application 210 receives selections of the recommended transformations or new transformations provided by the user. The data preprocessing system 100 builds the transformation script using the transformations selected or provided by the user. The transformation script comprises a sequence (or series) of transformations. These transformations transform the data so as to conform at least a portion of the data of the dataset to a form (or format) that can readily be processed by the big data analysis system 130.

Examples of transformation operations include splitting data of a column based into a plurality of columns, for example, a column storing address may be split into a plurality of columns comprising, a street number column, a street name column, a city column, a zip code, column and so on. Another transformation operation replaces empty columns with a default value. Another transformation operation replaces a particular substring of values in a column with a different substring, for example, to correct a commonly occurring error or typo. Another example of a transformation uses the standardize operator that performs standardization of one or more attributes or columns of the dataset. Details of the steps of the standardization operation are described in detail in the user interfaces disclosed in FIGS. 6-8 and processed described in FIGS. 9-10 among others.

The data preprocessing system 100 (or any other system) preprocesses 540 the entire dataset to be analyzed by executing the transformation script on the dataset. In an embodiment, the data preprocessing system 100 reads records of the dataset and executes the transformation script on the records.

The data preprocessing system 100 sends 550 the preprocessed dataset for analysis by the big data analysis system 130. The amount of data of the preprocessed dataset that can be analyzed by the big data analysis system 130 is larger than the amount of the original data from the input dataset that can be analyzed by the big data analysis system 130. This is so because a larger portion of the preprocessed dataset conforms to the formatting rules of the big data analysis system 130.

User Interface for Standardization of Data

Figure 6:
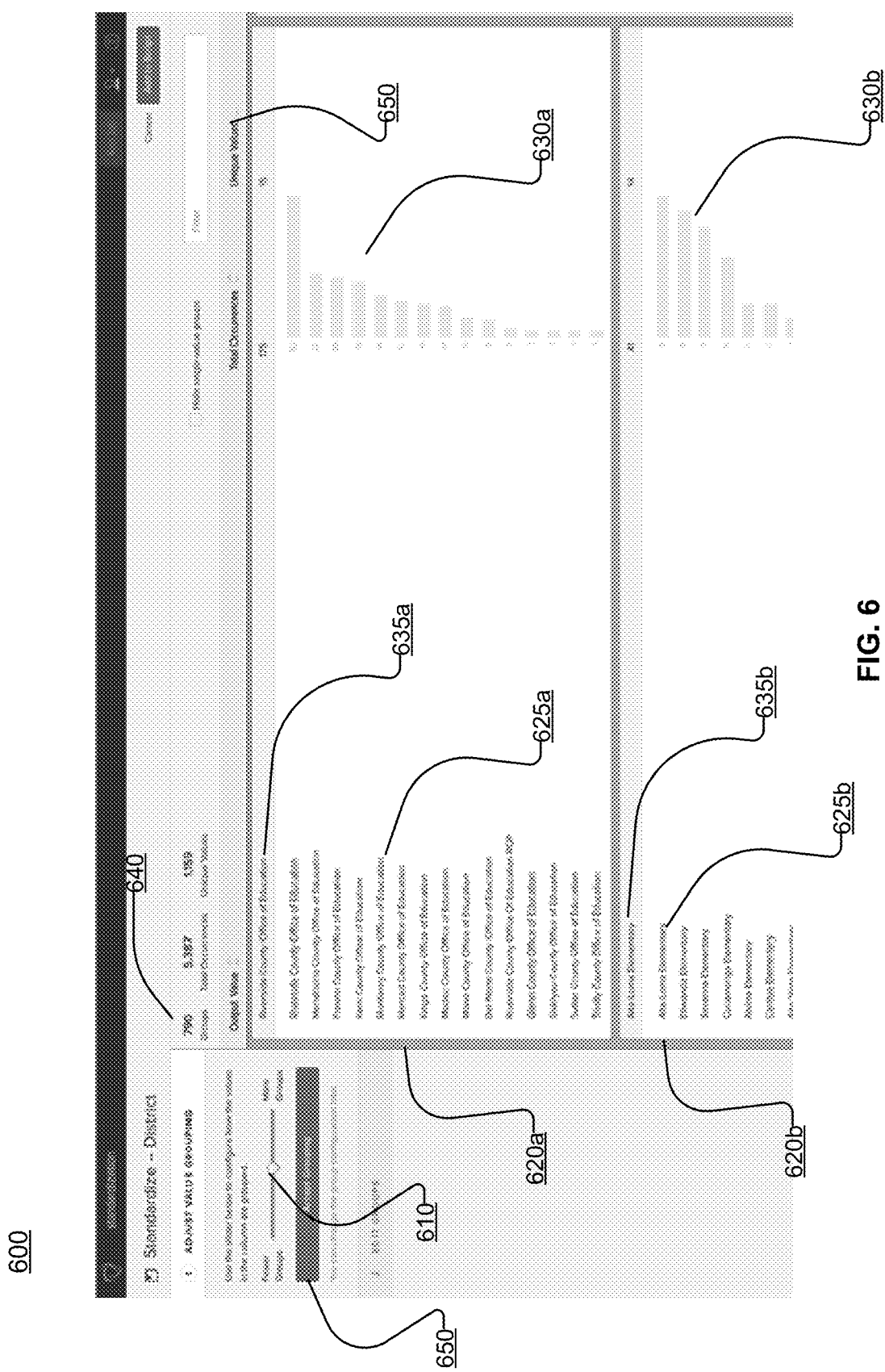
FIG. 6 shows a screenshot of a user interface illustrating standardization of data values of a column and presenting statistics describing each group, according to an embodiment.

FIG. 6 shows a screenshot of a user interface 600 illustrating standardization of data values of a column and presenting statistics describing each group, according to an embodiment. The user interface 600 presents a widget 610 for allowing users to specify a measure of strictness of the groups determined by the data preprocessing system 100. A group with a higher measure of strictness includes values that have a higher degree of similarity to each other compared to a less strict group. Accordingly, a group with a higher measure of strictness is likely to be smaller than a group with a lower measure of strictness. Furthermore, the likelihood of all members of the group representing the same value is higher. However, a group that has a higher measure of strictness may exclude values that match the values of the group but are less similar than values of the group based on certain distance metric based on differences between values. Similarly, a group with a lower measure of strictness is likely to be larger and have a higher likelihood of including members that represent different values. In an embodiment, the widget 610 is a slider that allows the user to specify values in a particular range x to y. The slider is associated with a line or a geometric shape having a length, wherein the slider pulled to the left most end of the line corresponds to the value x, the slider pulled to the right most end of the line corresponds to the value y, and the slider placed at any location in between the two ends corresponds to a value between x and y, wherein the value depends on the distance of the point where the slider is placed from the end points.

In an embodiment, the standardization module 200 uses a threshold value associated with a distance metric to determine groups of values or records. Accordingly, all values that are within the threshold distance from a data point associated with a group are included in the group and all values that are greater than the threshold distance from the data point are excluded from the group. The data point associated with the group may correspond to a value from the group, for example, the value with the highest frequency of occurrence in the group. Alternatively, the data point associated with the group may correspond to centroid of the group, for example, a mean value based on values of the group or a median value based on values of the group, or an aggregate value or weighted aggregate value based on values of the group.

If the standardization module 200 receives a user specification of a high value of the measure of strictness, the standardization module 200 uses a small threshold value for distance metric. Accordingly, only data values that are very close together, i.e., very similar to each other based on the distance metric are grouped together, resulting in strict grouping. Similarly, if the standardization module 200 receives a user specification of a low value of strictness, the standardization module 200 uses a high threshold value for distance metric. Accordingly, data values that may be far from each together, i.e., not very similar to each other based on the distance metric may also get grouped together. This results in a grouping that is not very strict. If the data values have large number of data entry errors or variations for other reasons, for example, due to use of abbreviations, aliases, etc., a less strict grouping is likely to map related elements together better than a very strict grouping.

In an embodiment, the threshold value used for determining groups is determined based on the measure of strictness specified by the user. For example, a slider position corresponding to a small value corresponds to a low measure of strictness and a slider position corresponding to a large value corresponds to a high measure of strictness. Alternatively, the slider position corresponding to a large value may correspond to a low measure of strictness and a slider position corresponding to a small value corresponds to a high measure of strictness. Accordingly, the request received by the data preprocessing system 100 may indicate a measure of the number of groups that the user wants (indicating whether the user requests more groups or fewer groups). Alternatively, the request received by the data preprocessing system 100 via the slider may indicate an overall measure of size of the groups (indicating whether the user requests smaller groups or larger groups).

Typically a high value of a measure of strictness of grouping results in smaller groups and a low value of the measure of strictness of grouping results in larger groups. However, this may depend on the data set and individual groups. For example, a large number of data values may be close together, resulting in a large group in spite of the user specifying strict grouping (i.e., a high measure of strictness.)

Furthermore, typically, the number of groups is higher if the user specifies stricter grouping and the number of groups is lower if the user specifies less strict grouping. Accordingly, typically, highly strict grouping corresponds to a large number of small groups and a less strict grouping corresponds to a small number of large groups. However, the actual number and sizes of groups may vary depending on the datasets.

FIG. 6 shows two groups 620*a* and 620*b*, and the user may be able to view more groups by scrolling up or down. The user interface 600 lists the unique elements 625 of each group. The user interface 600 may also present statistical information describing each group. For example, the user interface 600 shown in FIG. 6 shows the frequency of occurrence of each unique element within the group. The elements of each group are shown sorted on decreasing order of their frequency of occurrence. The user interface 600 also shows the total number of unique values in each group.

In an embodiment, the standardization module 200 selects a canonical value 635 for each group. The canonical value is the representative value of the group and the remaining values of the group represent variations of the canonical value. In an embodiment, the standardization module 200 determines a frequency of occurrence of each value of a group in the dataset. The standardization module 200 may determine a frequency of occurrence of each value of a group in a subset of the dataset, for example, a sample set. The standardization module 200 selects the value with the highest frequency of occurrence in the dataset or a sample of the dataset as the canonical value for the group. The data preprocessing system 100 suggests the selected value as the canonical value for the group via the user interface 600 and a user may either modify the selected canonical value by editing it or by selecting another value as the canonical value.

In an embodiment, the user may indicate that one or more elements are not part of a particular group or indicate that an entire group is incorrect and should be ungrouped. The standardization module 200 determines whether the elements that are excluded from a group belong to other group. Alternatively, the standardization module 200 determines whether new groups can be formed using the elements that were excluded from the groups or the elements obtained by ungrouping a group.

The user interface 600 may present additional statistical information 640 related to standardization, for example, total number of groups, total number of unique values, and total number of occurrences (i.e., sum of number of occurrences of each unique value). The user interface 600 includes a widget 650, for example, a button for accepting the grouping.

As a typical work flow scenario, a user may use the slider to vary the strictness of grouping and review each grouping generated. If the data preprocessing system 100 receives a request to increase the strictness of a group, the standardization module 200 evaluates each value that belongs to the group to ensure that the value is still a member of the group in view of the increased strictness. For example, the standardization module 200 determines a new threshold distance based on the increased strictness and compares each value to the canonical value of the group. If a distance between the value and the canonical value exceeds the new threshold distance, the value is excluded from the group, or else the value is kept in the group.

Once the user has selected a particular measure of strictness of grouping, the user can edit the canonical values corresponding to different groups if necessary. The user may also modify groups, for example, by including/excluding certain values in/from groups. Finally, when the user is done modifying the groups and canonical values of groups, the user accepts the grouping. In response to the user accepting the grouping, the data preprocessing system 100 adds a standardize operator to the transformation script being generated. The data preprocessing system 100 associates the standardize operator with the measure of strictness selected by the user and also the selections of canonical values.

Figure 7:
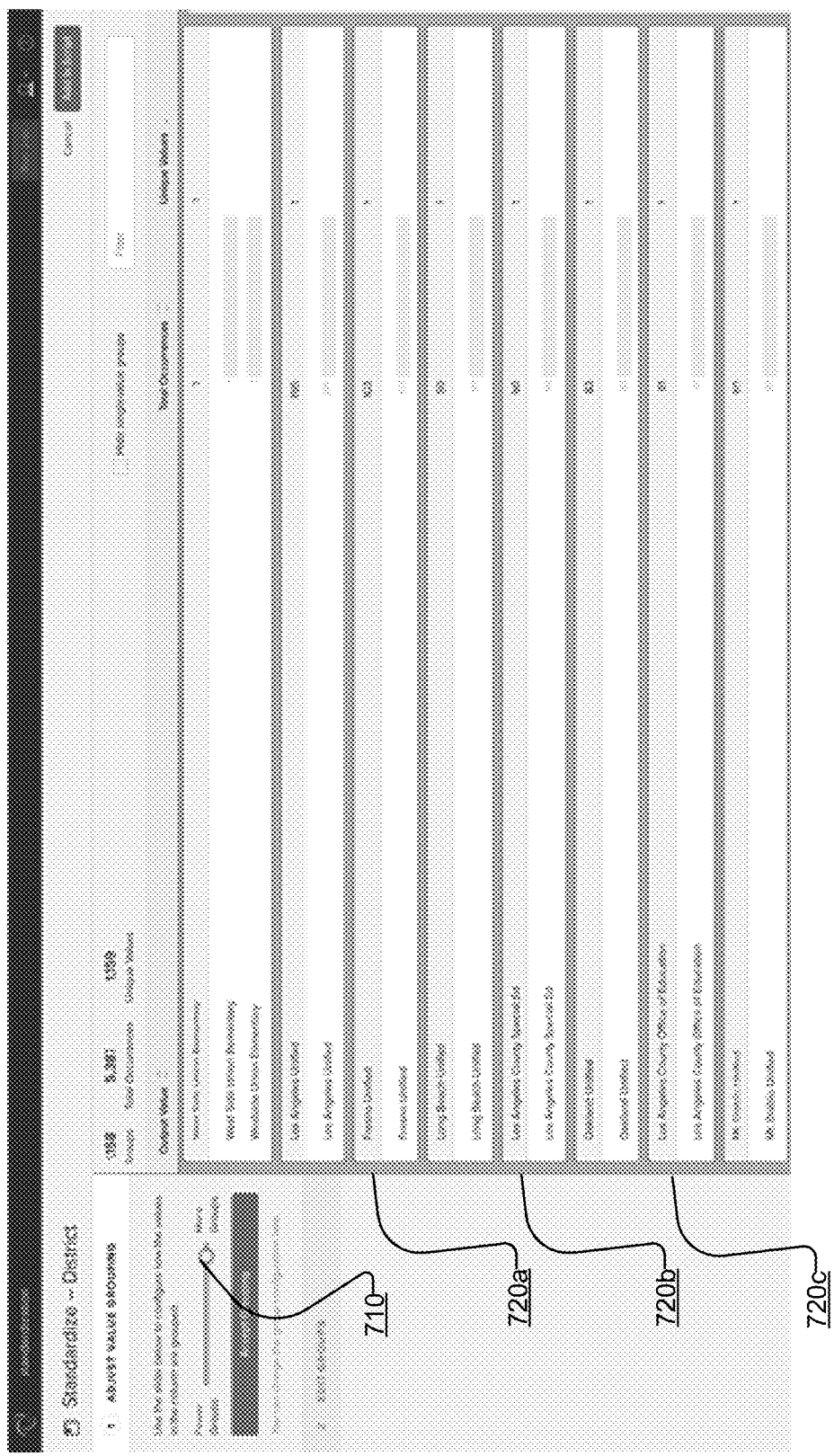
FIG. 7 shows a screenshot of a user interface illustrating standardization of data values of a column based on user request to create strict groups, according to an embodiment.

FIG. 7 shows a screenshot of a user interface illustrating standardization of data values of a column based on user request to create strict groups, according to an embodiment. As shown in FIG. 7, the user uses the slider 710 selects a high measure of strictness. Accordingly, a large number of groups 720 are generated, with each group having a small number of elements.

Figure 8:
FIG. 8 shows a screenshot of a user interface illustrating standardization of data values of a column based on user request to create less strict groups compared to those shown in FIG. 7, according to an embodiment.

FIG. 8 shows a screenshot of a user interface illustrating standardization of data values of a column based on user request to create less strict groups compared to those shown in FIG. 7, according to an embodiment. The user uses the slider 810 to select a lower measure of strictness. Accordingly, the standardization module 200 receives the measure of strictness and generates a smaller number of groups 820, the generated groups 820 having more elements in general than groups 720 shown in FIG. 7.

Overall Process for Standardization of Data

Figure 9:
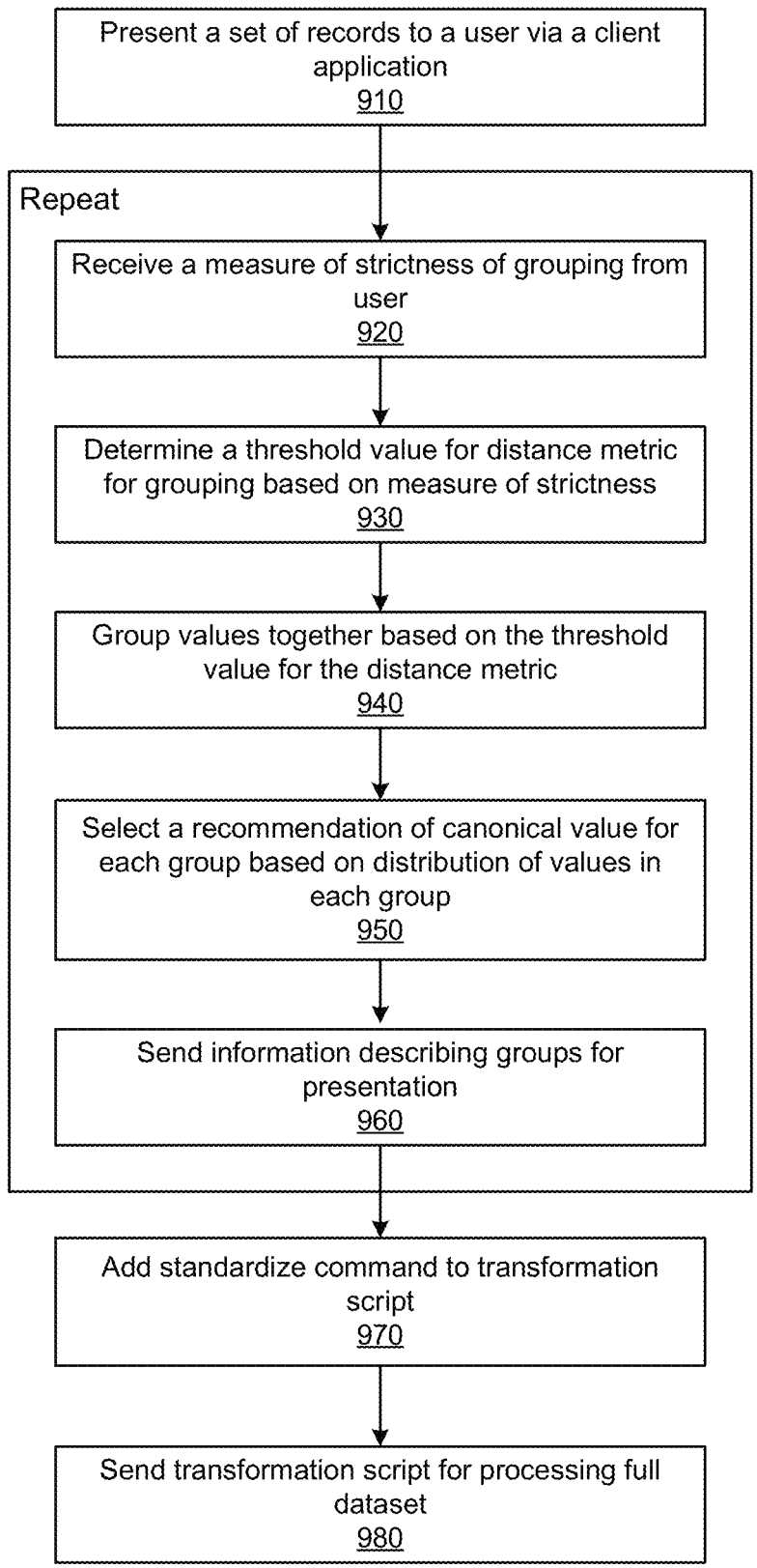
FIG. 9 shows the overall process of performing standardization using samples of a dataset, according to an embodiment.

FIG. 9 shows the overall process of performing standardization using samples of a dataset, according to an embodiment. In an embodiment, the process shown in FIG. 9 is performed as part of the step of building 530 a transformation script as described in FIG. 5. Various steps discussed can be executed in an order different from that shown herein. Furthermore, specific steps can be executed by modules different from those indicated herein.

The data preprocessing system 100 configures records of a dataset for presentation via the client application 210, and the client application 210 presents a set of records of the dataset to the user. In an embodiment, the data preprocessing system 100 determines a sample of the dataset and presents 910 the records of the sample to the user via the client application 210. Accordingly, the client application 210 interacts with the data preprocessing system 100 to perform grouping of the sample of dataset (or an entire dataset). The data preprocessing system 100 may perform the following steps (920, 930, 940, 950, and 960) multiple times.

The standardization module 200 receives 920 a measure of strictness for grouping the values of an attribute (or column) or sets of attributes (or columns). In an embodiment, the measure of strictness is received from user via the slider 610. The measure of strictness may be a numeric value between two values x and y (e.g., 0 and 1) such that a value closer to x implies less strict grouping and a value closer to y implies more strict grouping.

The standardization module 200 determines 930 threshold values for a distance metric based on the measure of strictness. If the standardization module 200 uses a plurality of distance metrics, the standardization module 200 uses the measure of strictness to determine threshold values for each distance metric from the plurality. In an embodiment, the standardization module 200 stores associations between values of measures of strictness and threshold values, for example, as a mapping table. The standardization module 200 looks up the mapping table to determine the threshold values for each distance metric corresponding to the measure of strictness.

The standardization module 200 groups 940 values together based on the threshold distance value. The standardization module 200 may group values together based on a clustering techniques that takes the threshold value as input. The standardization module 200 adds a value to a group if the value is within the threshold distance of a value representing the group. The value representing the group may be a centroid of the group or any value obtained by aggregating the various values of the group.

The standardization module 200 further determines statistics describing each group generated. As shown in FIGS. 6-8, the statistics describing each group include the frequency of occurrence of each unique element belonging to the group, the number of unique elements of the group, the total number of occurrences of values of the group, among others. The standardization module 200 provides the information describing the groups to the recommendation module 350.

The recommendation module 350 selects 950 a recommendation of a canonical value for each group. In an embodiment, the recommendation module 350 selects 950 the canonical value to be the unique value having the highest frequency of occurrence in the group. The standardization module 200 sends 960 information describing the generated groups and the recommendations of canonical values to the user via the user interface of the client application 210.

The data preprocessing system 100 receives further interactions from the user related to the groups generated. For example, the user may revise the selections of canonical values for groups or adjust the measure of strictness if the groupings are not acceptable. Once the user finalizes the grouping, the user may accept the grouping, for example, using the "accept grouping" button. If the user accepts the grouping, the data preprocessing system 100 adds 970 a standardize command to the transformation script. Once the transformation script is finalized, the data preprocessing script sends 980 the transformation script for processing of larger datasets or the full dataset from which the sample being processed by the data preprocessing system was obtained.

Figure 10:
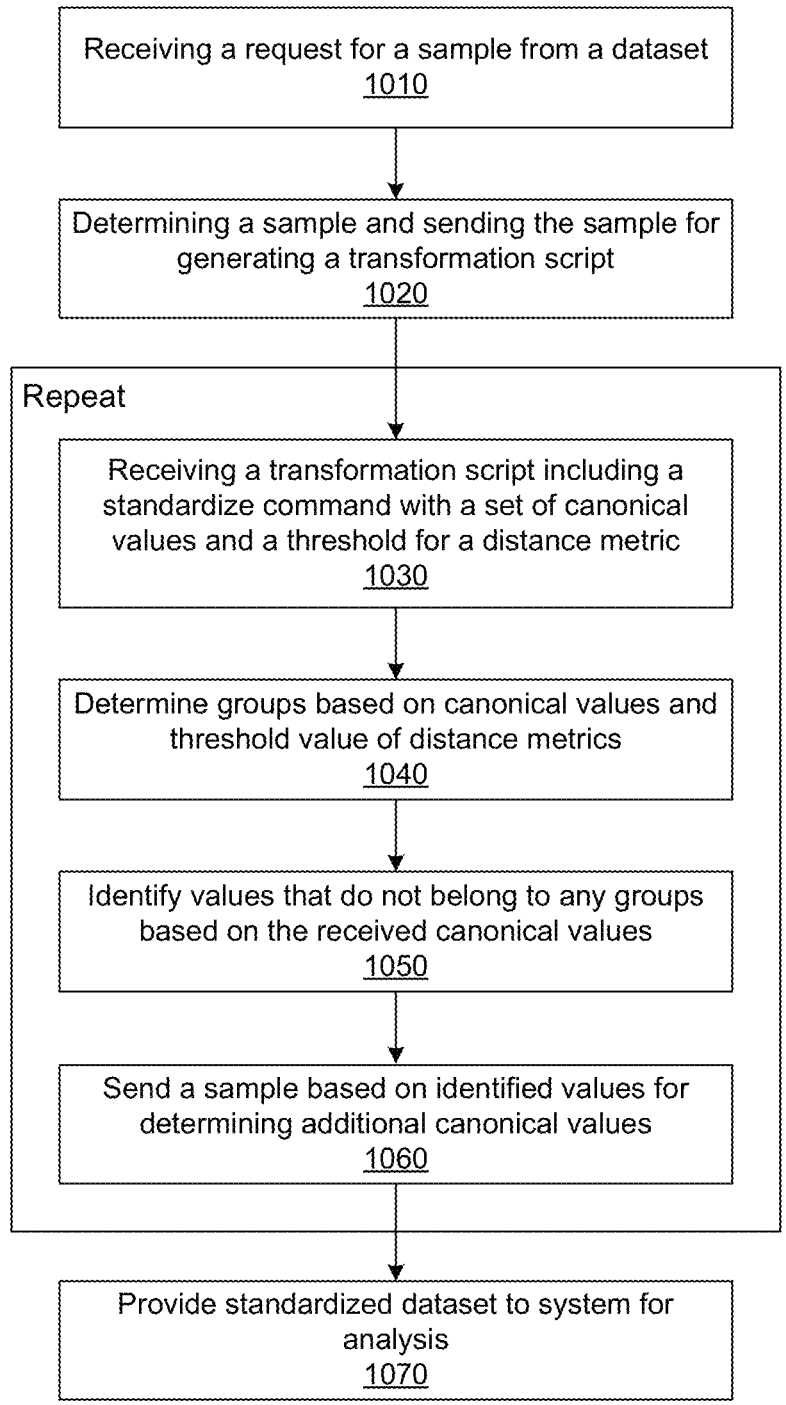
FIG. 10 shows the overall process of performing standardization over a full dataset or a different sample than the sample used by the process of FIG. 9, according to an embodiment.

FIG. 10 shows the overall process of performing standardization over a full dataset or a different sample than the sample used by the process of FIG. 9, according to an embodiment. The process illustrated in FIG. 10 may be executed by a distributed or parallel system that processes large datasets, for example, a big data analysis system 130 or by the data preprocessing system 100 (the system performing the process illustrated in FIG. 10 is referred to as an analysis system which can be either a data preprocessing system 100 or a big data analysis system 130). Various steps discussed can be executed in an order different from that shown herein. Furthermore, specific steps can be executed by modules different from those indicated herein.

The analysis system stores a dataset being analyzed. The analysis system receives 1010 a request for a sample of a dataset. The analysis system determines 1020 a sample of the dataset and sends the sample to either a data preprocessing system 100 or to a client application 210 for generating a transformation script. The analysis system may perform the following steps (1030, 1040, 1050, and 1060) multiple times.

The analysis system receives 1030 a transformation script that includes a standardize command. The standardize command is associated with a measure of strictness and also a list of canonical values for different groups. In an embodiment, the standardize command provides a mapping from a set of values of a group to the canonical values.

The analysis system determines 1040 groups based on canonical values and threshold values of distance metrics received with the standardize command. For example, the analysis system includes all values that are within the threshold value of the canonical value based on the distance metric in the group associated with the canonical value. In one embodiment, the analysis system standardizes the values within each group by identifying the value of an attribute in a record, identifying the group that both corresponds to the attribute and includes the identified value, and replacing the value of the attribute with the canonical value of the group (e.g., by using the mapping provided in the standardize command to map the identified value to the group's canonical value).

The analysis system also identifies 1050 values that cannot be associated with any group based on the received canonical values. This may happen because the canonical values were determined using a sample of the dataset and the full dataset may include several other values that are not related to the canonical values received. Accordingly, the analysis system may determine new groups based on these values by performing a grouping or clustering technique on these identified values.

Alternatively, the analysis system sends 1060 the identified values or a sample based on the identified values to the data preprocessing system 100 or the client application 210 for grouping. The data preprocessing system 100 or the client application 210 performs the process of FIG. 9 to determine groups of the new sample. This process may be repeated multiple times until the full dataset is standardized.

After the full dataset is standardized, the analysis system provides 1070 the standardized dataset to a system for analysis. In embodiments where the analysis system is a data preprocessing system 100, the analysis system may provide the standardized dataset to a big data analysis system 130. In embodiments where the analysis system is a big data analysis system 130, the analysis system may provide the standardized dataset to another module within the analysis system, or the analysis system may provide the standardized dataset to a different big data analysis system 130.

Figures 11A, 11B:
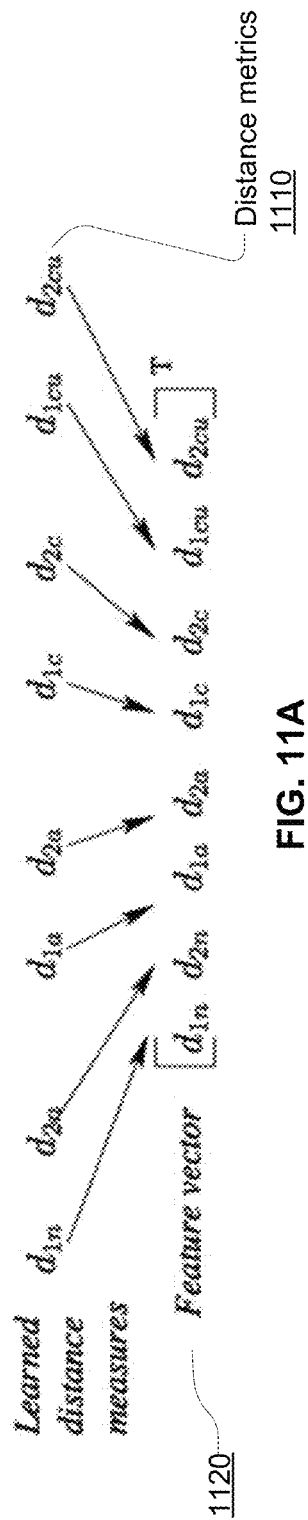
FIG. 11A shows an example feature vector that includes a plurality of distance metrics, according to an embodiment.
FIG. 11B illustrates two example records, according to an embodiment.

FIG. 11A illustrates an example feature vector 1120 that includes a plurality of distance metrics 1110, and FIG. 11B illustrates two example records, according to an embodiment. The data preprocessing system 100 uses several different distance metrics 1110 to perform grouping of values. The data preprocessing system 100 builds a feature vector 1120 based on the different distance metrics. The data preprocessing system 100 sends several questions to the user to confirm whether a pair of values represents the same value. For example, the data preprocessing system 100 sends the two records 1130, 1140 shown in FIG. 11B to the user with questions to confirm whether the pair of values in each column are the same (e.g., one question may ask whether addresses "8358 Sunset Blvd. West" and "8358 Sunset Blvd." are actually the same place). The data preprocessing system 100 uses the answers of the users as a training dataset to determine the effectiveness of different distance metrics 1110. In an embodiment, the data preprocessing system 100 selects a subset of the distance metrics 1110 of the feature vector 1120 and uses the selected subset for grouping the values. In other embodiments, the data preprocessing system 100 weighs the different distance metrics differently based on their effectiveness.

In some embodiments, the data preprocessing system 100 uses results of the questions described above to rank columns in terms of their effectiveness in grouping records of the dataset. The data preprocessing system 100 selects different pairs of values to test the effectiveness of different columns and verifies from the user whether the pairs represent the same value. Accordingly, the data preprocessing system 100 determines whether a grouping performed based on the groups determined by the standardization module 200 is accurate. The data preprocessing system 100 presents pairs of values to users receives data from users indicating whether users understood the pairs to represent the same value or different values. The data preprocessing system 100 determines whether the user input matches the grouping performed by the standardization module 200. This allows the data preprocessing system 100 to determine the accuracy of grouping records performed by the standardization module 200 based on the column from which the pairs were drawn. If the grouping performed by the standardization module 200 matches the results provided by more than a threshold percentage (or threshold number) of users (e.g., a percentage exceeding a threshold percentage, such as 95%), then the column is determined to have a high accuracy for grouping records.

If the data preprocessing system 100 determines that the accuracy of grouping based on a column is low (e.g., lower than a first threshold value), the data preprocessing system 100 excludes the column from the set of columns used for grouping records. In addition, if the data preprocessing system 100 determines the accuracy of grouping based on a column is low (e.g., lower than a second threshold value, which may or may not be the same as the first threshold value), the data preprocessing system 100 ranks that column higher for use as a blocking column. A blocking column is used for distributing records of the dataset across a plurality of processors.

Alternative Embodiments

It is to be understood that the figures and descriptions of the present invention have been simplified to illustrate elements that are relevant for a clear understanding of the present invention, while eliminating, for the purpose of clarity, many other elements found in a typical data preprocessing systems. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for standardizing values of a dataset, comprising:
   receiving a dataset for analysis by a data analysis system, the dataset comprising a plurality of records, each record having a plurality of attributes, each of the attributes having a value;
   determining a sample of the dataset comprising a subset of the plurality of records;
   using the sample of the dataset to perform steps comprising:
      selecting at least a first record and a second record of the sample of the dataset, each comprising respective values for at least a first attribute and a second attribute;
      generating a feature vector comprising at least a first distance between a value of the first attribute of the first record and a value of the first attribute of the second record and a second distance between a value of the second attribute of the first record and a value of the second attribute of the second record;
      determining based on the feature vector that the first attribute is suitable for grouping records of the dataset;
      identifying, from the sample, values of the first attribute of records of the subset of records;
      grouping the identified values of the first attribute into one or more groups, wherein each value of a group of the one or more groups has at least a threshold similarity to values of the group; and
      identifying a canonical value for each of the one or more groups, wherein each canonical value is a representative value of the attribute for the group;
   standardizing values of the dataset using the groups determined using the sample of the dataset, the standardizing comprising:
      identifying a value of the first attribute of a record,
      identifying a group of the one or more groups corresponding to the value of the first attribute of the record, based upon a level of similarity between the value of the first attribute of the record and the canonical value of the group, and
      replacing the value of the first attribute of the record with the canonical value of the group; and
   providing the standardized dataset as input for analysis by a data analysis system.

2. The method of claim 1, further comprising:
   receiving one or more user inputs indicating whether the values of the first attribute of the first and second records represent the same value, and whether the values of the second attribute of the first and second records represent the same value;
   determining that the first attribute is suitable for grouping records of the dataset based upon the received user inputs.

3. The method of claim 1, wherein identifying a group corresponding to the value of the first attribute of the record comprises:
   determining whether a value of the first attribute of the record is within a threshold distance from a canonical value associated with the group; and
   responsive to determining that the value is within the threshold distance, including the value in the group.

4. The method of claim 1, wherein the canonical value associated with the group represents an aggregate value based on values in the group.

5. The method of claim 1, wherein the canonical value associated with the group is the value with the highest frequency of occurrence in the sample of the dataset.

6. The method of claim 1, further comprising:
   for a group of values, receiving a measure of strictness, the measure of strictness specifying a degree of similarity of values within the group; and
   determining whether to add a value to the group based on the measure of strictness.

7. The method of claim 6, further comprising:
   determining a threshold distance value for a group based on a value of the measure of strictness for the group; and
   adding a new value to the group responsive to determining that a distance between the new value and a canonical value for the group is below the threshold distance.

8. The method of claim 7, wherein the threshold distance is a first threshold distance and the value of the measure of strictness is the first value of the measure of strictness, the method further comprising:
   receiving a second value of the measure of strictness for the group, wherein the second value is indicative of higher strictness compared to the first value of the measure of strictness;
   determining a second threshold distance value for a group based on the second value of measure of strictness for the group; and
   adding subsequent values to the group responsive to determining that a distance between the new value and a canonical value for the group is below the second threshold distance.

9. The method of claim 1, further comprising:
   determining a measure of accuracy for performing grouping based on a column of the dataset, the column comprising the values of attributes for a plurality of records in the dataset; and
   responsive to determining that the accuracy for performing grouping based on the column is lower than a threshold value, using the column for distributing records of the dataset across a plurality of processors.

10. A non-transitory computer-readable storage medium storing computer executable code for standardizing values of a dataset, the code comprising instructions for:

receiving a dataset for analysis by a data analysis system, the dataset comprising a plurality of records, each record having one or more attributes, each of the attributes having a value;
determining a sample of the dataset comprising a subset of the plurality of records;
using the sample of the dataset to perform steps comprising:
selecting at least a first record and a second record of the sample of the dataset, each comprising respective values for at least a first attribute and a second attribute;
generating a feature vector comprising at least a first distance between a value of the first attribute of the first record and a value of the first attribute of the second record and a second distance between a value of the second attribute of the first record and a value of the second attribute of the second record;
determining based on the feature vector that the first attribute is suitable for grouping records of the dataset;
identifying, from the sample, values of the first attribute of records of the subset of records;
grouping the identified values of the first attribute into one or more groups, wherein each value of a group of the one or more groups has at least a threshold similarity to values of the group; and
identifying a canonical value for each of the one or more groups, wherein each canonical value is a representative value of the attribute for the group;
standardizing values of the dataset using the groups determined using the sample of the dataset, the standardizing comprising:
identifying a value of the first attribute of a record,
identifying a group of the one or more groups corresponding to the value of the first attribute of the record, based upon a level of similarity between the value of the first attribute of the record and the canonical value of the group, and
replacing the value of the first attribute of the record with the canonical value of the group; and
providing the standardized dataset as input for analysis by a data analysis system.

11. The computer-readable storage medium of claim 10, further comprising:
receiving one or more user inputs indicating whether the values of the first attribute of the first and second records represent the same value, and whether the values of the second attribute of the first and second records represent the same value;
determining that the first attribute is suitable for grouping records of the dataset based upon the received user inputs.

12. The computer-readable storage medium of claim 10, wherein identifying a group corresponding to the value of the first attribute of the record comprises:
determining whether a value of the first attribute of the record is within a threshold distance from a canonical value associated with the group; and
responsive to determining that the value is within the threshold distance, including the value in the group.

13. The computer-readable storage medium of claim 10, wherein the canonical value associated with the group represents an aggregate value based on values in the group.

14. The computer-readable storage medium of claim 10, the code further comprising instructions for:

for a group of values, receiving a measure of strictness, the measure of strictness specifying a degree of similarity of values within the group; and
determining whether to add a value to the group based on the measure of strictness.

15. The computer-readable storage medium of claim 14, the code further comprising instructions for:
determining a threshold distance value for a group based on the measure of strictness for the group; and
adding a new value to the group responsive to determining that a distance between the new value and a canonical value for the group is below the threshold distance.

16. The computer-readable storage medium of claim 15, the code further comprising instructions for:
receiving a second value of the measure of strictness for the group, wherein the second value is indicative of higher strictness compared to the first value of the measure of strictness;
determining a second threshold distance value for a group based on the second value of measure of strictness for the group; and
adding subsequent values to the group responsive to determining that a distance between the new value and a canonical value for the group is below the second threshold distance.

17. The computer-readable storage medium of claim 10, the code further comprising instructions for:
determining a measure of accuracy for performing grouping based on a column of the dataset, the column comprising the values of attributes for a plurality of records in the dataset; and
responsive to determining that the accuracy for performing grouping based on the column is lower than a threshold value, using the column for distributing records of the dataset across a plurality of processors.

18. A computer-implemented system comprising:
a computer processor; and
a computer-readable storage medium storing computer executable code for standardizing values of a dataset, the code comprising instructions for:
receiving a dataset for analysis by a data analysis system, the dataset comprising a plurality of records, each record having one or more attributes, each of the attributes having a value;
determining a sample of the dataset comprising a subset of the plurality of records;
using the sample of the dataset to perform steps comprising:
selecting at least a first record and a second record of the sample of the dataset, each comprising respective values for at least a first attribute and a second attribute;
generating a feature vector comprising at least a first distance between a value of the first attribute of the first record and a value of the first attribute of the second record and a second distance between a value of the second attribute of the first record and a value of the second attribute of the second record;
determining based on the feature vector that the first attribute is suitable for grouping records of the dataset;
identifying, from the sample, values of the first attribute of records of the subset of records;
grouping the identified values of the first attribute into one or more groups, wherein each value of a group of the one or more groups has at least a threshold similarity to values of the group; and identifying a canonical value for each of the one or more groups, wherein each canonical value is a representative value of the attribute for the group;

standardizing values of the dataset using the groups determined using the sample of the dataset, the standardizing comprising:

identifying a value of the first attribute of a record, identifying a group of the one or more groups corresponding to the value of the first attribute of the record, based upon a level of similarity between the value of the first attribute of the record and the canonical value of the group, and replacing the value of the first attribute of the record with the canonical value of the group; and providing the standardized dataset as input for analysis by a data analysis system.

19. The method of claim 1, wherein standardizing values of the dataset using the groups determined using the sample of the dataset further comprises:

identifying at least one value of the first attribute of at least one record of the dataset not part of the sample of the dataset not associated with any groups of the one or more groups, based upon a level of similarity between the at least one value of the first attribute and the canonical values of the one or more groups;

defining at least one additional group based upon at least one value of the first attribute; and replacing the at least one value of the first attribute with a canonical value of the at least one additional group.

20. The method of claim 1, wherein grouping is performed using a distance metric, the method further comprising:

identifying a plurality of distance metrics;

receiving a data set comprising known pairs of equivalent values;

determining effectiveness of each of the plurality of distance metrics based on the dataset; and selecting a distance metric for grouping based on the determined effectiveness of the distance metrics.

21. The method of claim 1, further comprising, selecting a column for grouping, the method comprising:

identifying a plurality of columns;

for each of the plurality of columns, grouping a set of records to determine a plurality of groups of records;

determining accuracy of the groups of records based by comparing pairs of records from each group of records against user defined pairs of equivalent records; and selecting a column grouping based on the determined accuracy.

* * * * *